(12) United States Patent
Aoki

(10) Patent No.: US 7,720,378 B2
(45) Date of Patent: May 18, 2010

(54) OPTICAL MODULE AND OPTICAL SWITCH

(75) Inventor: Yasuhiko Aoki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 908 days.

(21) Appl. No.: 11/439,239

(22) Filed: May 24, 2006

(65) Prior Publication Data
US 2007/0201868 A1 Aug. 30, 2007

(30) Foreign Application Priority Data
Feb. 28, 2006 (JP) .............................. 2006-053930

(51) Int. Cl.
*H04J 14/00* (2006.01)
(52) U.S. Cl. .............................. 398/47; 398/45; 398/46
(58) Field of Classification Search ............. 398/45–48, 398/52
See application file for complete search history.

(56) References Cited

U.S. PATENT DOCUMENTS 6,480,309 B1 * 11/2002 Lee et al. ....................... 398/45

2004/0071160 A1 * 4/2004 Park et al. .................... 370/465
2005/0013568 A1 * 1/2005 Handelman ................... 385/122

OTHER PUBLICATIONS

A. Tajima, et al. "10-GB/S/Port Gated Divider Passive Combiner Optical Switch with Single-Mode-To-Multimode combiner" IEEE Photonic Technology Letters vol. 10, No. 1 pp. 162-164 (1998).
I. Ogawa, et al. "Lossless Hybrid Integrated 8-CH Optical Wavelength Selector Module Using PLC Platform and PLC-PLC Direct Attachment Techniques" Optical Fiber Communication Conference PD4 1-4.4 1998.

* cited by examiner

*Primary Examiner*—Dzung D Tran
(74) *Attorney, Agent, or Firm*—Staas & Halsey LLP

(57) ABSTRACT

In the optical module, the number of optical components is decreased, so that the costs of the device are reduced, and so that optical loss is reduced. The present device comprises: an optical gate array in which a plurality of optical gate switches each employing a semiconductor optical amplifier element are arranged in parallel; a dividing/combining unit including: a plurality of first ports connected one to each of the plurality of optical gate switches forming the optical gate array; and a second port which performs dividing/combining of light with the first port; and an optical amplifier connected to the second port of the dividing/combining unit, wherein the optical gate array, the dividing/combing unit, and the optical amplifier are formed in an integrated manner.

10 Claims, 13 Drawing Sheets

| TYPE | MERIT |
|---|---|
| MMI COUPLER 3A (FIG. 2) | SMALL-SIZED, MULTIPLE BRANCHING |
| SLAB-TYPE OPTICAL COUPLER 3B (FIG. 9) | EASY TO MANUFACTURE |
| OPTICAL COUPLER 3C (FIG. 10) | WIDE 3DB BAND |
| OPTICAL SWITCH (FIG. 11) | LOW LOSS DUE TO SWITCHING OPERATION |

# OPTICAL MODULE AND OPTICAL SWITCH

BACKGROUND OF THE INVENTION

1) Field of the Invention

The present invention relates to an optical module and an optical switch device suitable for use in an optical communication system.

2) Description of the Related Art

Since SOAs (Semiconductor Optical Amplifiers) are capable of operating at high speeds as optical switches, their application as optical switching elements for switching optical paths at high speeds has been regarded as promising. It is possible for a single SOA to operate as an optical gate switch, that is, a 1×1 optical switch. Further, multiple (n-number of) SOAs arranged in parallel function as an n×1 (or 1×n) optical switch 100 as shown in FIG. 19.

Here, the optical switch 100 in FIG. 19 is formed by an optical gate array 101, an optical coupler 102, and SOAs 103. These are provided as separate optical modules and are optically connected by means of optical fibers. The optical gate array 101 includes n ("8" in FIG. 19)-number of SOAs 101*a*, forming the optical gate array 101, arranged in parallel. Optical isolators 104*a* and 104*b* are arranged at the input and the output terminal of each of the SOAs 101*a* forming the optical gate array 101, and also, optical isolators 104*c* and 104*d* are arranged at the input and the output terminal of the SOA 103.

With this arrangement, when the optical switch 100 of FIG. 19 is given as an 8×1 optical switch, eight SOAs 101*a* of the optical gate array 101 let one of the eight beams of input light input through the isolator 104*a* pass through the optical switch to the optical coupler 102, while blocking other beams of input light. The optical coupler 102 outputs the light from the optical gate array 101 to the SOA 103, which appropriately amplifies the light from the optical gate array 101 in order to compensate for optical loss which has been caused when the light passes through the optical coupler 102.

Further, when the optical switch 100 of FIG. 19 is constructed as a 1×8 optical switch, the input and the output are inversed. That is, the SOA 103 amplifies light input through the optical isolators 104*d*, and the optical coupler 102 divides the light into eight outputs. Then, the eight SOAs 101*a* of the optical gate array 101 receive the eight beams of light divided by the optical coupler 102, respectively, and let one of the eight light beams pass therethrough to the optical isolator 104*a* side, and block the other light.

In this instance, the optical isolators 104*a* through 104*d* let only light proceeding from the optical gate array 101 to the SOA 103 pass therethrough, and block light proceeding in the opposite direction. As a result, reflection light is prevented from returning back to the SOAs 101*a* and 103, whereby laser oscillation is prevented.

That is, when the optical isolators 104*a* through 104*d* functions as the 8×1 optical switches 100, they let light proceeding from the optical gate array 101 to the SOA 103 pass therethrough and block light proceeding from the SOA 103 to the optical gate array 101. In contrast, the optical isolators 104*a* through 104*d* for the 1×8 optical switches 100 let light proceeding from the SOA 103 to the optical gate array 101 pass therethrough, and block light proceeding from the optical gate array 101 to the SOA 103.

Further, the following non-patent documents 1 and 2 show the publicly known arts relating to the preset invention:

(Non-patent Document 1) IEEE Photonic Technology Letters Vol. 10, No. 1, pp 162-164 (1998) Single-Mode to Multimode Combiner (Non-patent Document 2) Optical Fiber Communication Conference PD4. 1-4. 4 1998 Title: "Lossless Hybrid Integrated 8-ch Optical Wavelength Selector Module Using PLC Platform and PLC-PLC Direct Attachment Technique"

However, according to the art of FIG. 19, to realize good amplification characteristics of the SOAs 101*a* of the optical gate array 101 and of the SOA 103, optical isolators need to be arranged over optical propagation paths. Thus, the number of components is increased, thereby increasing the device cost. Further, as optical insertion loss is increased, improvement in optical switch characteristics is prevented.

In particular, optical communication systems can include optical switches having such semiconductor amplifiers connected in multiple stages. In such optical switches, the number of components is thus increased, resulting in increase in the cost of the device, and optical insertion loss due to increase in the number of optical components is also increased.

SUMMARY OF THE INVENTION

With the foregoing problems in view, one object of the present invention is to reduce the number of optical components, thereby reducing the cost of the device. Another object of the invention is to reduce the number of components, thereby reducing optical loss.

In order to accomplish the above object, according to the present invention, there is provided an optical module, comprising: an optical gate array in which a plurality of optical gate switches each employing a semiconductor optical amplifier element are arranged in parallel; a dividing/combining unit including: a plurality of first ports connected one to each of the plurality of optical gate switches forming the optical gate array; and a second port which performs dividing/combining of light with the first port; and an optical amplifier connected to the second port of the dividing/combining unit, wherein the optical gate array, the dividing/combing unit, and the optical amplifier are formed in an integrated manner.

As a preferred feature, the optical gate array lets one of the incoming light beams to its plurality of optical gate switches pass therethrough, and outputs the light beam to the dividing/combining unit via the first port corresponding to the optical gate switch which the light beam passes through, and the optical amplifier amplifies the light beam input from the second port of the dividing/combining unit and then outputs the amplified light.

As another preferred feature, the optical amplifier amplifies incoming light and outputs the amplified light to the second port of the dividing/combining unit, and the dividing/combining unit divides and outputs the light amplified by the amplifier to the plurality of optical gate switches via the plurality of first ports, and the plurality of optical gate switches let one of the plurality of light beams, which are divided and output from the dividing/combining unit, pass therethrough and then be output.

As a generic feature, there is provided an optical switch device, comprising: m-number of 1×n optical dividing units which receive incoming light input from m-number of input ports and divide the received light to n-number of output ports; n-number of m×1 optical combining units each of which combines m-number of light beams input from the m-number of 1×n optical dividing units, the n-number of m×1 optical combining units outputting the combined light to the n-number of output ports; wherein each of the m×1 optical combining units selectively outputs one of the m-number of light beams from the m-number of 1×n optical dividing units, thereby serving as an m×1 optical switch unit which outputs one of the light beams from the m-number of input ports to a pertinent output port, and wherein each of the m×1 optical switch units include at least one combining-side optical module, which includes: an optical gate array in which a plurality of optical gate switches each employing a semiconductor optical amplifier element are arranged in parallel; a dividing/combining unit including: a plurality of first ports connected one to each of the plurality of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, wherein the optical gate array lets one of the incoming light beams to its plurality of optical gate switches pass therethrough, and outputs the light beam to the dividing/combining unit via the first port corresponding to the optical gate switch which the light beam passes through, and wherein the optical amplifier amplifies the light beam input from the second port of the dividing/combining unit and then outputs the amplified light.

As a preferred feature, each of the m×1 optical switch units include: an optical gate array in which m-number of optical gate switches are arranged in parallel; a dividing/combining unit including: m-number of first ports connected one to each of the m-number of optical gate switches forming the optical gate; and a second port which performs dividing/combining of light with the first port; and an optical amplifier connected to the second port of the dividing/combining unit, the optical gate array, the dividing/combing unit, and the optical amplifier being formed in an integrated manner as a single combining-side optical module.

As another preferred feature, each of the m×1 optical switch units includes: a first combining unit which firstly combines m-number of light beams from the m-number of 1×n optical dividing units into q (m>q)-number of paths; and a second combining unit which further combines the q-number of paths, which have been combined by the first combining unit, into a single path, wherein the first combining unit has q-number of combining-side optical modules arranged in parallel, each of the combining-side optical modules including: an optical gate array in which p-number of optical gate switches, forming the optical gate array, are arranged in parallel; a dividing/combining unit including: p-number of first ports connected one to each of the p-number of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, and wherein each of the q-number of combining-side optical module receives p-number, out of m-number of light beams from the m-number of 1×n optical dividing units, of light beams, and the q-number of combining side optical modules cooperate with one another and thus select light to be output to a pertinent output port.

As yet another preferred feature, each of the 1×n optical dividing units is configured as a dividing-side optical module including: an optical gate array in which a plurality of optical gate switches are arranged in parallel; a dividing/combining unit including: a plurality of first ports connected one to each of the plurality of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, and wherein the optical amplifier amplifies incoming light and outputs the amplified light to the second port of the dividing/combining unit, wherein the dividing/combining unit divides and outputs the light amplified by the amplifier to the plurality of optical gate switches via the plurality of first ports, and wherein the plurality of optical gate switches let one of the plurality of light beams divided and output from the dividing/combining unit pass therethrough and then be output.

As a further preferred feature, each of the 1×n optical dividing units includes: an optical gate array in which n-number of optical gate switches are arranged in parallel; a dividing/combining unit including: n-number of first ports connected one to each of the n-number of optical gate switches; and a second port which performs dividing/combining of light with the first port; and an optical amplifier connected to the second port of the dividing/combining unit, the optical gate array, the dividing/combing unit, and the optical amplifier being formed in an integrated manner as a single dividing-side optical module, wherein the optical amplifier amplifies incoming light and outputs the amplified light to the second port of the dividing/combining unit, wherein the dividing/combining unit divides and outputs the light amplified by the amplifier to the plurality of optical gate switches via the n-number of first ports, and, wherein the n-number of optical gate switches let one of the plurality of light beams, which are divided and output from the dividing/combining unit, pass therethrough and then be output.

As a still further preferred feature, each of the 1×n optical dividing units includes: a first dividing unit which firstly divides incoming light from the corresponding input port into s-number of light beams; a second dividing unit which further divides each of the s-number of light beams, which have been divided by the first dividing unit, into r-number of light beams, wherein the second dividing unit has s-number of dividing-side optical modules arranged in parallel, each of the dividing-side optical modules including: an optical gate array in which r-number of optical gate switches are arranged in parallel; a dividing/combining unit including: r-number of first ports connected one to each of r-number of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, and wherein the s-number of dividing-side optical modules cooperate with one another and thus select an output port to which light from the first dividing unit is to be output.

As another generic feature, there is provided an optical switch device, comprising: m-number of 1×n optical dividing units each of which divides incoming light from one of m-number of input ports to n-number of output ports; and n-number of m×1 optical combining units each of which combines m-number of light beams one from each of the m-number of 1×n optical dividing units, and outputs a light beam to an output port assigned to each of the m×1 optical combining units, wherein each of the 1×n optical dividing units is configured as a 1×n optical switch unit which outputs light from the input port to an m×1 optical combining unit which is coupled to one of the n-number of output ports, wherein each of the 1×n optical switch unit includes at least one dividing-side optical module, which includes: an optical gate array in which a plurality of optical gate switches each employing a semiconductor optical amplifier element are arranged in parallel; a dividing/combining unit including: a plurality of first ports connected one to each of the plurality of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, and wherein the optical amplifier amplifies incoming light and outputs the amplified light to the second port of the dividing/combining unit, wherein the dividing/combining unit divides and outputs the light amplified by the amplifier to the plurality of optical gate switches via the plurality of first ports, and, wherein the plurality of optical gate switches let one of the plurality of light beams, which are divided and output from the dividing/combining unit, pass therethrough and then be output.

As a preferred feature, each of the 1×n optical dividing units includes: an optical gate array in which n-number of optical gate switches are arranged in parallel; a dividing/combining unit including: n-number of first ports connected one to each of the n-number of optical gate switches; and a second port which performs dividing/combining of light with the first port; and an optical amplifier connected to the second port of the dividing/combining unit, the optical gate array, the dividing/combing unit, and the optical amplifier being formed in an integrated manner as a single dividing side optical module, wherein the optical amplifier amplifies incoming light and outputs the amplified light to the second port of the dividing/combining unit, wherein the dividing/combining unit divides and outputs the light amplified by the amplifier to the plurality of optical gate switches via the n-number of first ports, and, wherein the n-number of optical gate switches let one of the plurality of light beams, which are divided and output from the dividing/combining unit, pass therethrough and outputs the light.

As another preferred feature, each of the 1×n optical dividing units includes: a first dividing unit which firstly divides incoming light from the corresponding input port into s-number of light beams; a second dividing unit which further divides each of the s-number of light beams, which have been divided by the first dividing unit, into r-number of light beams, wherein the second dividing unit has s-number of dividing-side optical modules arranged in parallel, each of which dividing-side optical modules include: an optical gate array in which r-number of optical gate switches are arranged in parallel; a dividing/combining unit including: r-number of first ports connected one to each of r-number of optical gate switches forming the optical gate array; and a second port which performs dividing/combining of light with the first port; and an optical amplifier connected to the second port of the dividing/combining unit, the optical gate array, the dividing/combing unit, and the optical amplifier being formed in an integrated manner, and wherein the s-number of dividing-side optical modules cooperate with one another and thus select an output port from which light from the first dividing unit is to be output.

In this manner, the present invention provides an optical module including: an optical gate array formed by optical gate switches, each employing a semiconductor amplifier element, arranged in parallel; a dividing/combining unit having multiple first ports connected to multiple optical gate switches forming the optical gate array and a second port which performs dividing/combining with the first ports; an optical amplifier connected to the second port of the dividing/combining unit, and the optical gate array, the dividing/combining unit, and the optical amplifier, all formed in an integrated manner. This guarantees the following advantages: the number of components is reduced, thereby reducing the manufacturing cost of the device, and optical loss of the whole of the device is reduced.

Other objects and further features of the present invention will be apparent from the following detailed description when read in conjunction with the accompanying drawings.

DESCRIPTION OF THE PREFERRED EMBODIMENT(S)

A description will be made herein below of embodiments of the present invention with reference to the accompanying drawings. It is to be noted that embodiments of the present invention should by no means be limited to the ones described below. Further, other technological issues, and means for solving such technological issues, and effects and benefits of the present invention will be apparent from the following detailed description when read in conjunction with the accompanying drawings.

[a] First Embodiment

Figure 1:
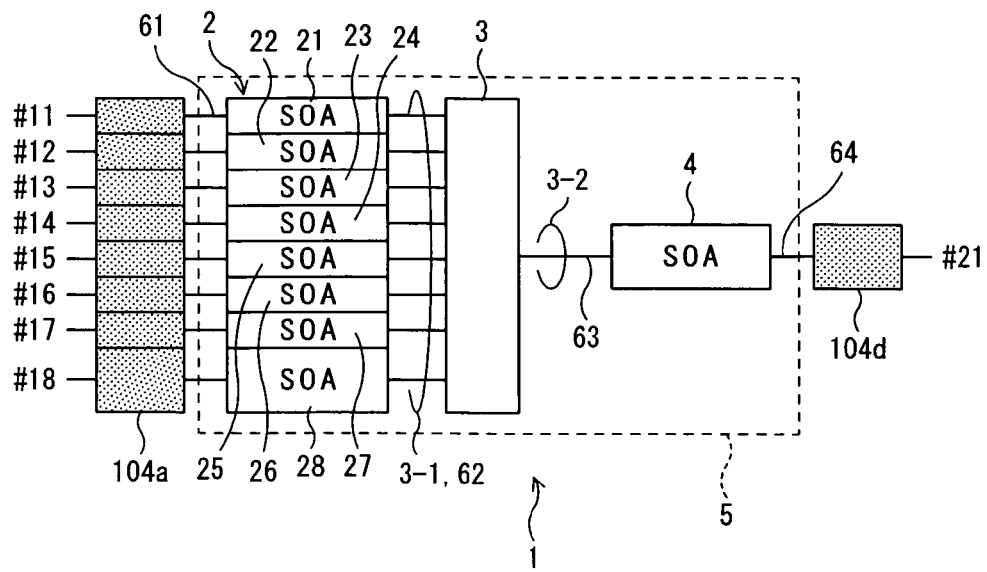
FIG. 1 is a diagram showing an optical module viewed from above according to a first embodiment of the present invention.

FIG. 1 is a diagram showing an optical module viewed from above according to a first embodiment of the present invention. As in the case of the optical module already described with reference to FIG. 19, the optical module 1 of FIG. 1 is configured as n×1 (n is an integer larger than 1) or a 1×n optical switch. Differing from the one already described with reference to FIG. 19, an optical gate array 2, a dividing/combining unit 3, and SOAs 4 are mounted on one and the same semiconductor substrate 5 in an integrated manner.

Figure 19:
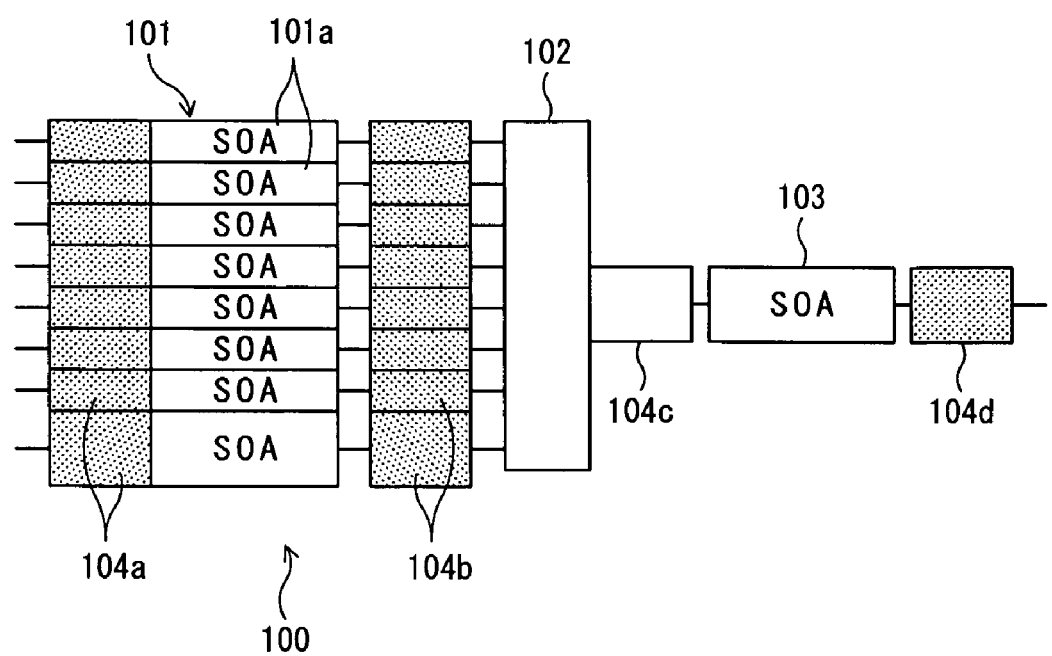
FIG. 19 is a diagram showing a related art of the present invention.

This integrated construction eliminates the necessity of the optical isolators 104b and 104c which are necessary for the optical switch 100 including the optical gate array 101, the optical coupler 102, and the SOAs 103 as separate modules, as shown in FIG. 19.

Here, the optical gate array 2 is formed by multiple (eight in the first embodiment) optical gate switches 21 through 28, each employing an SOA, a semiconductor optical amplifier element, arranged in parallel. In particular, the optical gate array 2 can have a construction in which optical gate switches 21 through 28 are integratedly arranged in parallel.

The dividing/combining unit 3 is formed on the semiconductor substrate 5, and has eight first ports 3-1 which are connected to eight optical gate switches 21 through 28 respectively and a second port 3-2 which divides/combines light with the first ports 3-1.

Figure 2:
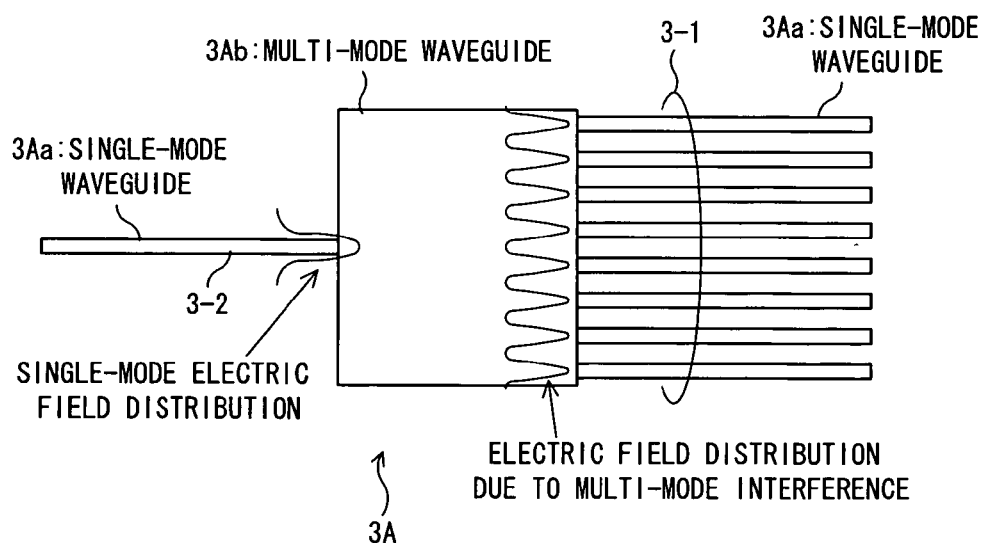
FIG. 2 is a diagram showing an important part of the optical module of the first embodiment.

More specifically, in the dividing/combining unit 3, light input from the eight first ports 3-1 is combined and output via the second port 3-2, and light input from the second port 3-2 is divided into eight light beams and output to the eight optical gate switches 21 through 28 via the first port 3-1. In this instance, the dividing/combining unit 3 is realized by an MMI coupler 3A as shown in FIG. 2.

In the MMI coupler 3A, single-mode waveguides 3Aa are provided on the first port 3-1 side and the second port 3-2 side, and a multi-mode waveguide 3Ab is provided between the single-mode waveguide 3Aa on the first port 3-1 side and that on the second port 3-2 side. For example, if single-mode light is input from the second port 3-2, electric field distribution is caused due to multi-mode interference in the multi-mode waveguide 3Ab, single-mode light is distributed to the eight single-mode waveguides 3Aa on the first port 3-1 side, and is optically coupled thereto.

Further, the SOA 4 is a semiconductor optical amplifier connected to the second port 3-2 of the dividing/combining unit 3.

With this arrangement, when the optical module 1 functions as an 8×1 optical switch, the end portion thereof on the optical gate array 2 side serves as an input terminal, and the end portion on the SOA 4 serves as an output terminal. That is, the optical gate array 2 lets one of the light beams input to the eight optical gate switches 21 through 28 pass therethrough, and outputs the light beam to the dividing/combining unit 3 via the first port 3-1 corresponding to the optical gate switch 21 through 28 which the light beams pass through. The dividing/combining unit 3 then outputs the light beam from the optical gate array 2 to the SOA 4, which amplifies the light input from the second port 3-2 of the dividing/combining unit 3 and outputs the amplified light.

On the other hand, when the optical module 1 functions as a 1×8 optical switch, the end portion of the optical module on the SOA 4 side serves as an input terminal, and the end portion on the optical gate array 2 serves as an output terminal. That is, the SOA 4 amplifies incoming light, and outputs the amplified light to the second port 3-2 of the dividing/combining unit 3, which divides the light input from the second port 3-2 into eight light beams, and then outputs the light beams to the optical gate switches 21 through 28 respectively via the eight first ports 3-1. After that, the eight optical gate switches 21 through 28 output one of the light beams divided and output by the dividing/combining unit 3.

In this instance, the application of the above-mentioned MMI coupler 3A as the dividing/combining unit 3 provides the following merits: a small-sized multiple-branching dividing/combining unit 3 is realized; and the value of n of the 1×n (n×1) optical switch can take a large value.

Here, optical isolators 104a and 104d are provided as necessary at the end portion on the optical gate array 2 side and at the end portion on the SOA 4 side, in order to prevent laser oscillation by the SOAs forming the optical gate switches 21 through 28 and by the SOA 4. However, there is no longer need for the optical isolators 104b and 104c of FIG. 19, between the optical gate array 2 and the dividing/combining unit 3, or between the dividing/combining unit 3 and the SOA 4, which are formed on the same substrate in an integrated manner.

That is, as an optical propagation path, including optical gate switches 21 through 28, the dividing/combining unit 3, and the SOA 4, is formed continuously with homogenous material on the same substrate (detailed below), variation in refractivity, which causes light reflection over the propagation path including these optical gate switches 21 through 28, the dividing/combining unit 3, and the SOA 4, is substantially eliminated. As a result, optical components for reflection prevention, that is, optical isolators or the like, need not be inserted.

Figure 3:
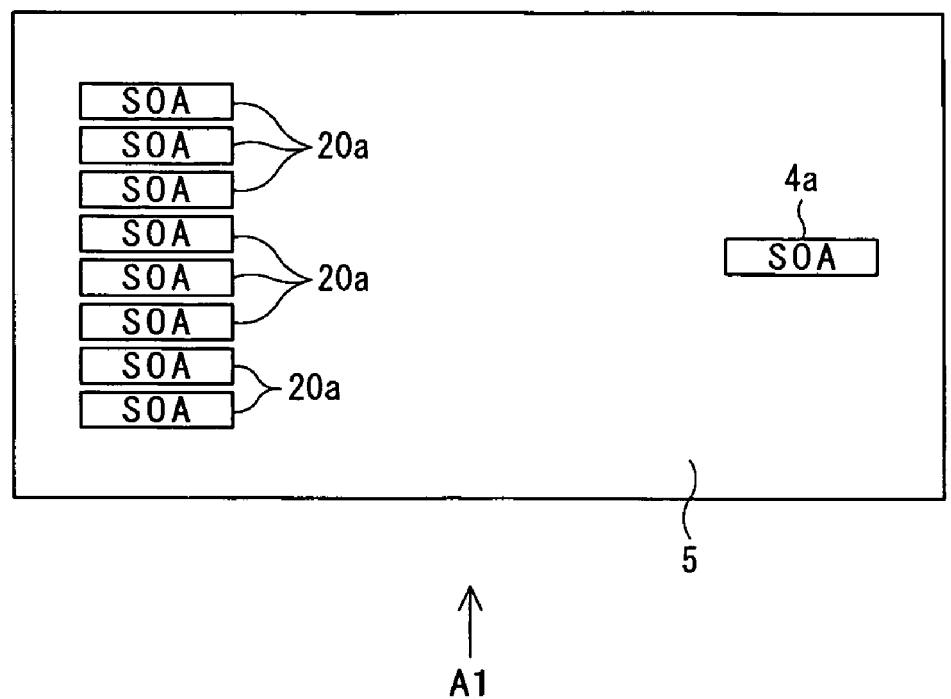
FIG. 3 through FIG. 8 are diagrams for describing a manufacturing process of the optical module according to the first embodiment.
Figure 4:
Figure 5:
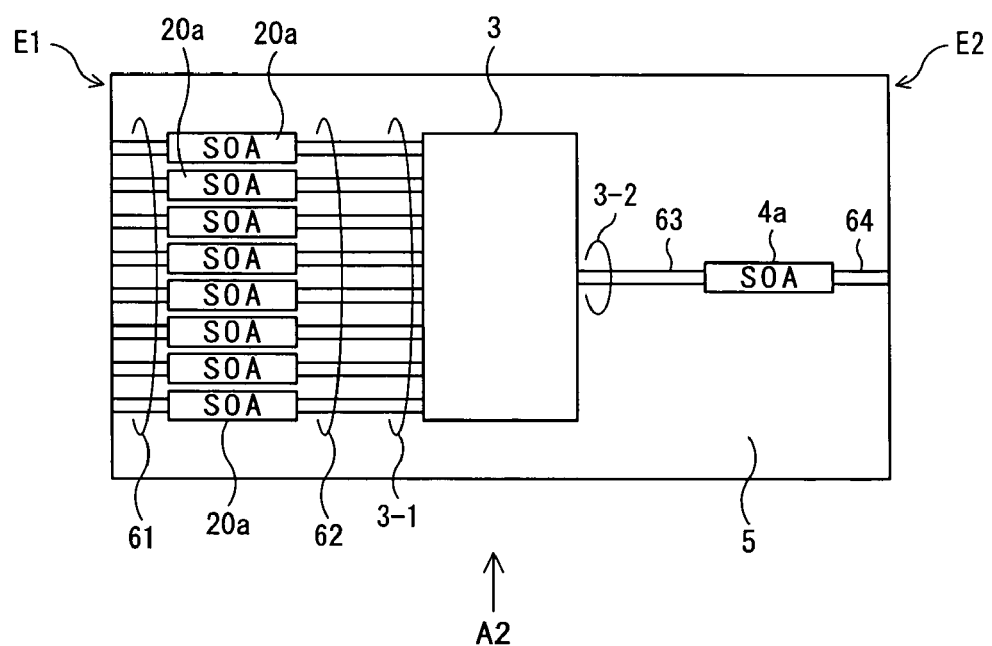
Figure 6:
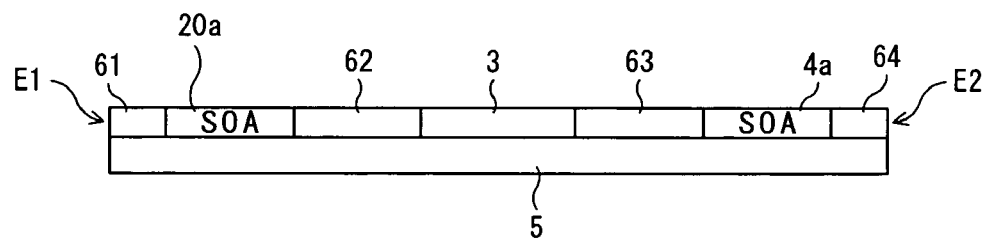
Figure 7:
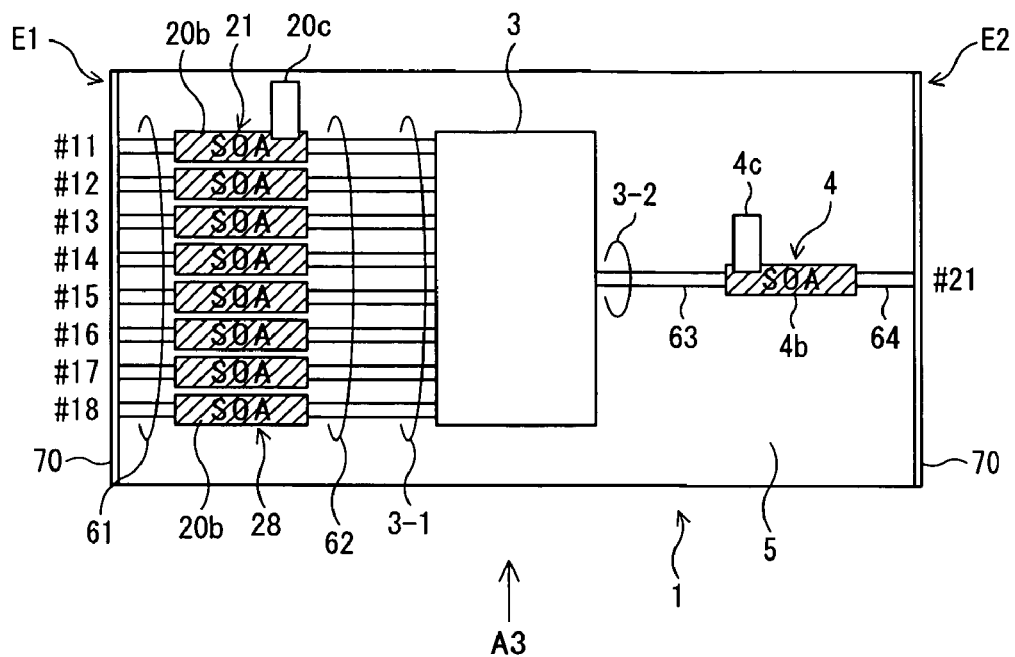
Figure 8:
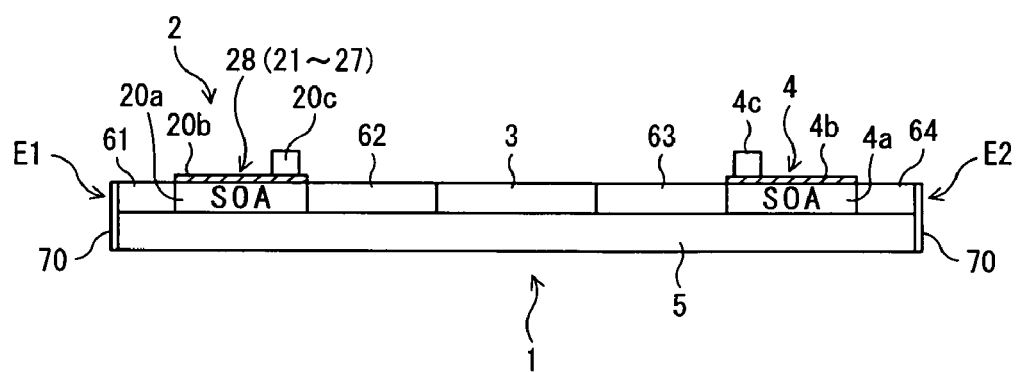

FIG. 3 through FIG. 8 are diagrams for describing a manufacturing process of the optical module 1 according to the first embodiment. FIG. 3, FIG. 5, and FIG. 7 are diagrams viewed from above like FIG. 1; FIG. 4, FIG. 6, and FIG. 8 are side views seen in the direction of arrows A1 through A3.

A manufacturing process of an optical module 1 is as follows. First of all, as shown in FIG. 3 and FIG. 4, eight SOA layers 20a for optical gate switches, which form an optical gate array 2, and an SOA layer 4a for the SOA 4 are formed on the semiconductor substrate 5 for growth of crystal such as of GaAs, InP, Si, and etc. That is, patterning is performed together with film forming due to crystal growth, thereby forming the SOA layers 20a and the SOA layer 4a at specified positions on the substrate 5.

Subsequently, as shown in FIG. 5 and FIG. 6, by performing film forming due to crystal growth and patterning, a dividing/combining unit 3 and waveguides 61 through 64 are formed. Here, the reference character 61 designates waveguides each connecting between each of the SOA layer 20a and the side end E1 of the substrate; the reference character 62 designates waveguides each connecting between the optical gate switches 21 through 28 and the first ports 3-1 of the dividing/combining unit 3; the reference character 63 designates a waveguide connecting between the second port 3-2 of the dividing/combining unit 3 and the SOA layer 4a; the reference character 64 designates a waveguide connecting between the SOA layer 4a and the side end E2 of the substrate, which serves as the input/output terminal.

Further, as shown in FIG. 7 and FIG. 8, reflection prevention films 70 are formed at the opposite substrate ends E1 and E2. On each of the SOA layers 20a, an electrode 20b and an electric wiring pattern 20c for voltage application for gate switching control are formed, whereby SOAs as the optical gate switches 21 through 28 are produced. Likewise, an electrode 4b and an electric wiring pattern 4c for optical amplification are formed on the SOA layer 4a, whereby an SOA 4 is produced. In this manner, the optical module 1 is manufactured. Note that FIG. 8 illustrates the electric wiring pattern 20c with attention paid to the SOA 28, and the other electric wiring patterns 20c forming the SOAs 21 through 27 are not illustrated.

As shown in FIG. 7 and FIG. 8, in the optical module 1 thus constructed, the substrate side end E1 serves as the input terminal, and eight input ports #11 through #18 are provided. The substrate side end E2 serves as the output terminal, and one output port #21 is provided. Voltage for gate switching control is applied to an electrode 20b. In this manner, the optical module 1 is constructed as an 8×1 optical switch. In contrast, the substrate side end E2 serves as the input terminal, and one input port #21 is provided. The substrate side end E1 serves as the output terminal, and eight output ports #11 through #18 are provided. Voltage for gate switching control is applied to the electrodes 21b through 28b. In this manner, the optical module 1 is constructed as a 1×8 optical switch. Further, the SOA 4 performs optical amplification, thereby compensating for optical loss caused by combination and division by the optical coupler 3.

Here, since the optical gate array 2, the optical coupler unit 3, and the SOA 4 are formed on the substrate 5 in an integrated manner, variation in refractivity which can cause light reflection in optical propagation paths of the SOA layers 20a and 4a of the optical gate switches 21 through 28 and the SOA 4, respectively, and in the optical waveguides 61 through 64, is suppressed, so that reflection of propagation light is substantially eliminated at any of the connections between the optical gate array 1, the optical coupler unit 3, and the SOA 4.

According to the construction of the optical switch 100 as shown in FIG. 19, in order to realize high gains of the SOAs 101a and 103, isolators must always be introduced to the input and the output side of the SOAs 101a and 103 for the purpose of oscillation suppression and gain ripple reduction. However, according to the construction of the first embodiment, since all of the optical gate array 2, the optical coupler unit 3, and the SOA 4 are integrated using semiconductor devices, the number of connection points between semiconductor devices and optical fibers is decreased, so that internal optical loss is reduced.

As described so far, according to the first embodiment, since the optical gate array 2, the optical coupler unit 3, and the SOA 4 are formed on the substrate 5 in an integrated manner, variation in refractivity which can cause light reflection in optical propagation paths of the SOA layers 20a and 4a of the optical gate switches 21 through 28 and the SOA 4, respectively, and in the optical waveguides 61 through 64, is suppressed, so that optical isolators are no longer necessary. Since the number of components is thus decreased, the manufacturing cost of the device is reduced, and optical loss of the whole device is also reduced.

In other words, the construction of FIG. 1 makes it possible to reduce the number of optical components such as optical isolators in a 1×n or an n×1 selective optical switch, and to reduce the number of connection points between optical semiconductor devices and optical fibers, in comparison with the construction of FIG. 19. Thus, in comparison with the construction of FIG. 19, it is possible to reduce excess loss inside the switch and to reduce crosstalk, so that optical signal characteristics are improved.

Figure 9:
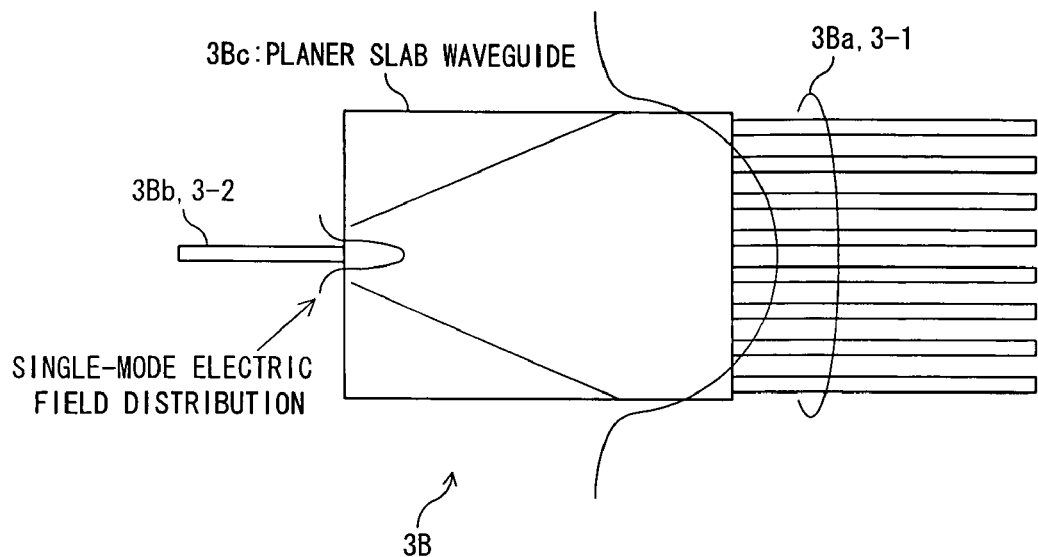
FIG. 9 through FIG. 11 and FIG. 13 are diagrams showing modified examples of the first embodiment.

In this instance, in the above first embodiment, the dividing/combining unit 3 is provided as an MMI coupler 3A. The present invention, however, should by no means be limited to this, and a slab-shaped optical coupler 3B of FIG. 9 is also applicable. In addition, the optical coupler 3C of FIG. 10 in which 3 dB couplers 3C-1 through 3C-3 are connected in multiple stages is also applicable. Further, as shown in FIG. 11, the optical switch 3D in which 1×2 (or 2×1) optical switches 3D-1 through 3D-3 are connected in multiple stages is applicable.

In the optical coupler 3B of FIG. 9, multiple waveguides 3Ba forming the first port 3-1 are formed, and one waveguide 3Bb forming the second port 3-2 is formed. Between these waveguides 3Ba and waveguide 3Bb, a planer slab waveguide 3Bc is formed. In the planer slab waveguide 3Bc, incoming light input from the waveguide 3Bb spreads by propagating in a free space, and is coupled to each of the waveguides 3Ba.

Figure 10:
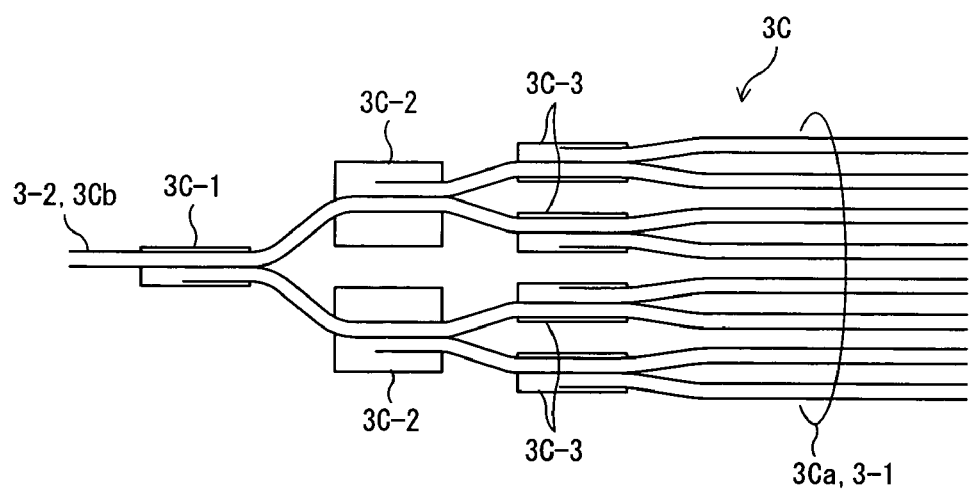

Further, the optical coupler 3C of FIG. 10 includes: a 3 dB coupler 3C-1 which divides a single waveguide 3Cb, forming the second port 3-2, into two; two 3 dB couplers 3C-2 each of which divides the light, divided by the optical coupler 3C-1 into two, further into two; and four 3 dB couplers 3C-3 each of which divides the light, divided by the optical couplers 3C-2 into two, further into two. The waveguides of these four 3 dB couplers 3C-3 are constructed as multiple waveguides 3Ca forming the first port 3-1.

Figures 11, 12:
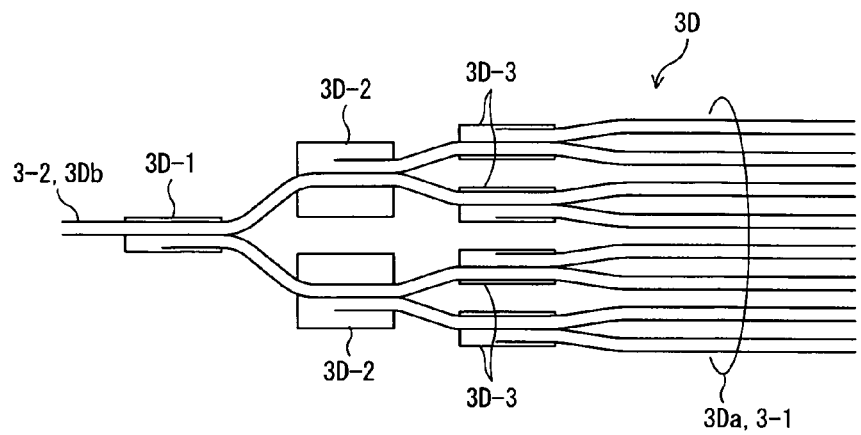
FIG. 12 is a diagram for describing effects and benefits of the modified examples of the first embodiment.

Further, the optical switch 3D of FIG. 11 includes: a 1×2 optical switch 3D-1 which selectively outputs the light input from the waveguide 3Db, which forms the second port 3-2, to either of the two-divided paths; two 1×2 optical switches 3D-2 which selectively output the light selectively input from the waveguide to any of the further divided paths divided by the optical switch 3D-2; and four 1×2 optical switches 3D-2 which further selectively output the light selectively input from the waveguide to either of the two-divided output waveguides. These waveguides divided by the four 1×2 optical switches 3D-3 are constructed as multiple waveguides 3Da forming the first port 3-1. In this instance, when light is input from the first port 3-1 and is output from the second port 3-2, each of the optical switches 3D-1 through 3D-3 functions as a 2×1 optical switch.

As shown in FIG. 12, when the dividing/combining unit 3 is given as the above-described MMI coupler 3A, the size of the device is reduced, and the dividing/combining unit 3 with a great number of branches is realized. The optical coupler 3B of FIG. 9 is easy to manufacture. The optical coupler unit 3C of FIG. 10 makes it possible to divide/combine a wide 3 dB, that is, a wide wavelength band. The optical coupler unit 3D of FIG. 11 can realize optical low loss and reduce crosstalk.

Of the ports #11 through #18 corresponding to the SOAs 21 through 28, respectively, which form the optical gate array 2, if the port #11 (see FIG. 1) is selected, light input to the SOA 21 is allowed to pass therethrough (ON state), and light input to the other SOAs 22 through 28 is blocked (OFF state). At this time, assuming that optical power output from the SOA 21 through 28 is given as P1 through P8, respectively, and that power components derived from the SOA 21 through 28 output from the second port 3-2 of the dividing/combining unit 3 are given as p1 through p8, respectively, crosstalk can be expressed by the following equation:

$$\text{Crosstalk} = (p2 + p3 + \ldots + P8)/P1 \tag{1}$$

In this instance, if the dividing/combining unit 3 is given as the optical coupler 3A through 3C of FIG. 2, FIG. 9 or FIG. 10, light output from the second port 3-2 is obtained by simply adding up components of light output from the SOAs 21 through 28. Accordingly, an optical power component pi (i=1 through 8) output from the second port 3-2 becomes pi=Pi, and the crosstalk CT1 is given by the following equation (1)':

$$CT1 = (P2 + P3 + \ldots + P8)/P1 \tag{1}'$$

In contrast, when the dividing/combining unit 3 is given as the optical switch 3D of FIG. 11, the optical switch 3D-3 switches between light from the SOA 21 and light from the SOA 22, and the optical switch 3D-2 switches between light from the SOA 21 and light from the SOA 23 or the SOA 24, and the optical switch 3D-1 switches between light from the SOA 21 and light from any of the SOAs 25 through 28. The light is then output from the second port 3-2.

At this time, the value of crosstalk CT2 of the light output from the second port 3-2 is reduced in comparison with that obtained by the above mentioned equation (1). That is, in the 2×1 optical switch 3D-3 to which outputs of the SOA 21 and 22 are connected, light from the optical path connected to the SOA 21 is selectively output. Thus, a component of leak light p2 output from the second port 3-2 through the optical switch 3D-3 and the optical switch 3D-2 and 3D-1 of the later stage is reduced by an Extinction Ratio (ER) of the optical switch 3D-3, and becomes p2=P2/ER. In this instance, ER takes a value larger than 1.

The outputs from the SOAs 23 and 24 are switched by the optical switch 3D-3 and are input to the optical switch 3D-2 which selects between the light from the SOAs 23 and 24 and the light from the SOA 21. Since the optical switch 3D-2 selectively outputs the light from the optical path connected to the SOA 21, components of leak light P3 and p4 output from the optical switch 3D-2 to the optical switch 3D-1 of a later stage are reduced by ERs (Extinction Ratios) of the two optical switches 3D-3 and 3D-2, and become (P3+p4)/ER$^2$ (ER>1).

Likewise, components of leak light P5 through P8 output to the optical switch 3D-1 are reduced by ERs of the three optical switches 3D-3 through 3D-1, and become (P5+P6+P7+P8)/ER$^3$. Accordingly, the value of crosstalk of light output from the second port 3-2 of the optical switch 3D is expressed by the following equation (2):

$$CT2=\{(P2/ER)+(P3+P4)/(ER)^2+(P5+P6+P7+P8)/(ER)^3\}/P1 \qquad (2)$$

Accordingly, since CT2 expressed by the equation (2) is smaller than CT1 expressed by the equation (1)' by the numerator, crosstalk can be reduced, so that signal quality is improved.

Figure 13:
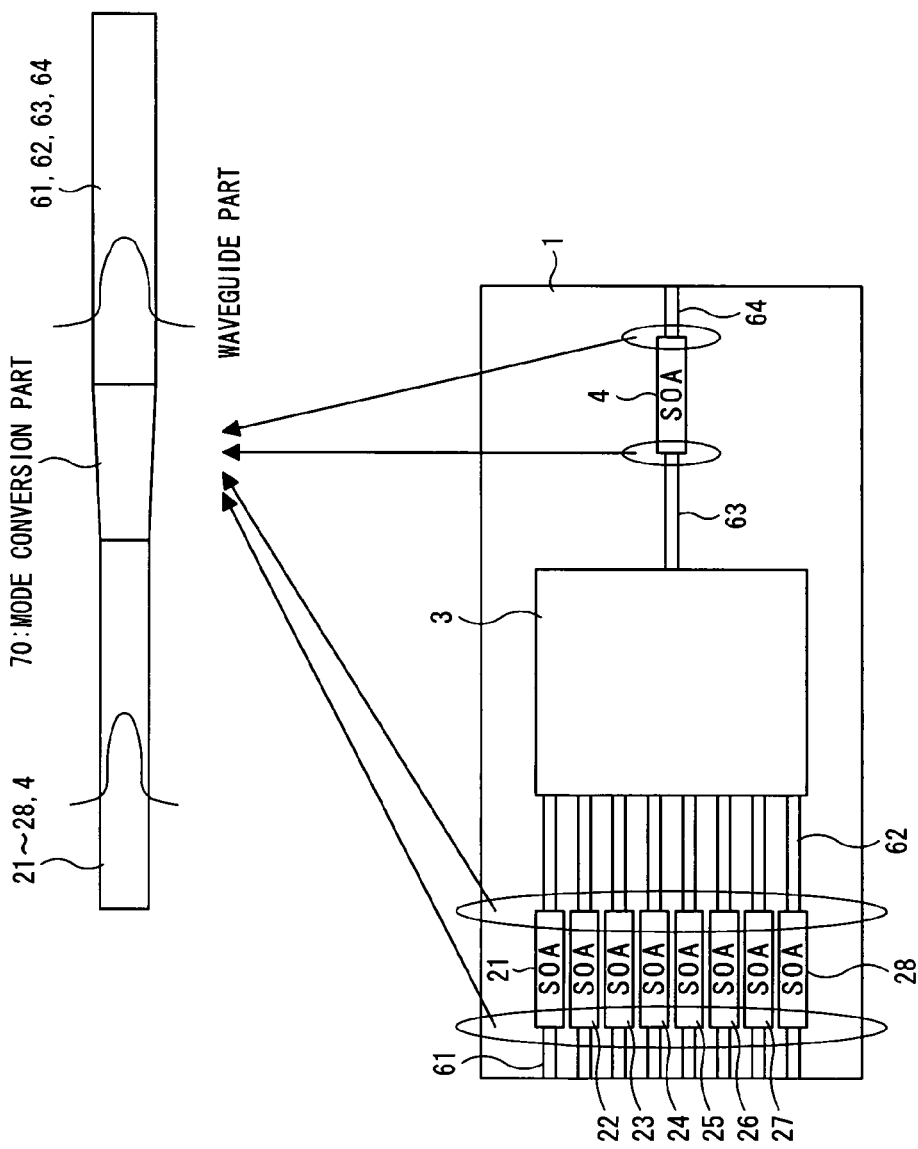

As a modified example of the above-described first embodiment, as shown in FIG. 13, a mode converting part 70, which is for mode matching of propagation light, can be inserted between the SOAs 21 through 28 and the waveguide 62. This arrangement makes it possible to reduce optical loss by mode matching between light passing through the SOAs 21 through 28 and light propagating through the waveguide 62. It is also possible to arrange a mode converting unit 70 between the SOAs 21 through 28 and the waveguide 61, or between the SOA 4 and the waveguide 63 or 64, for the same reason.

[b] Second Embodiment

Figure 14:
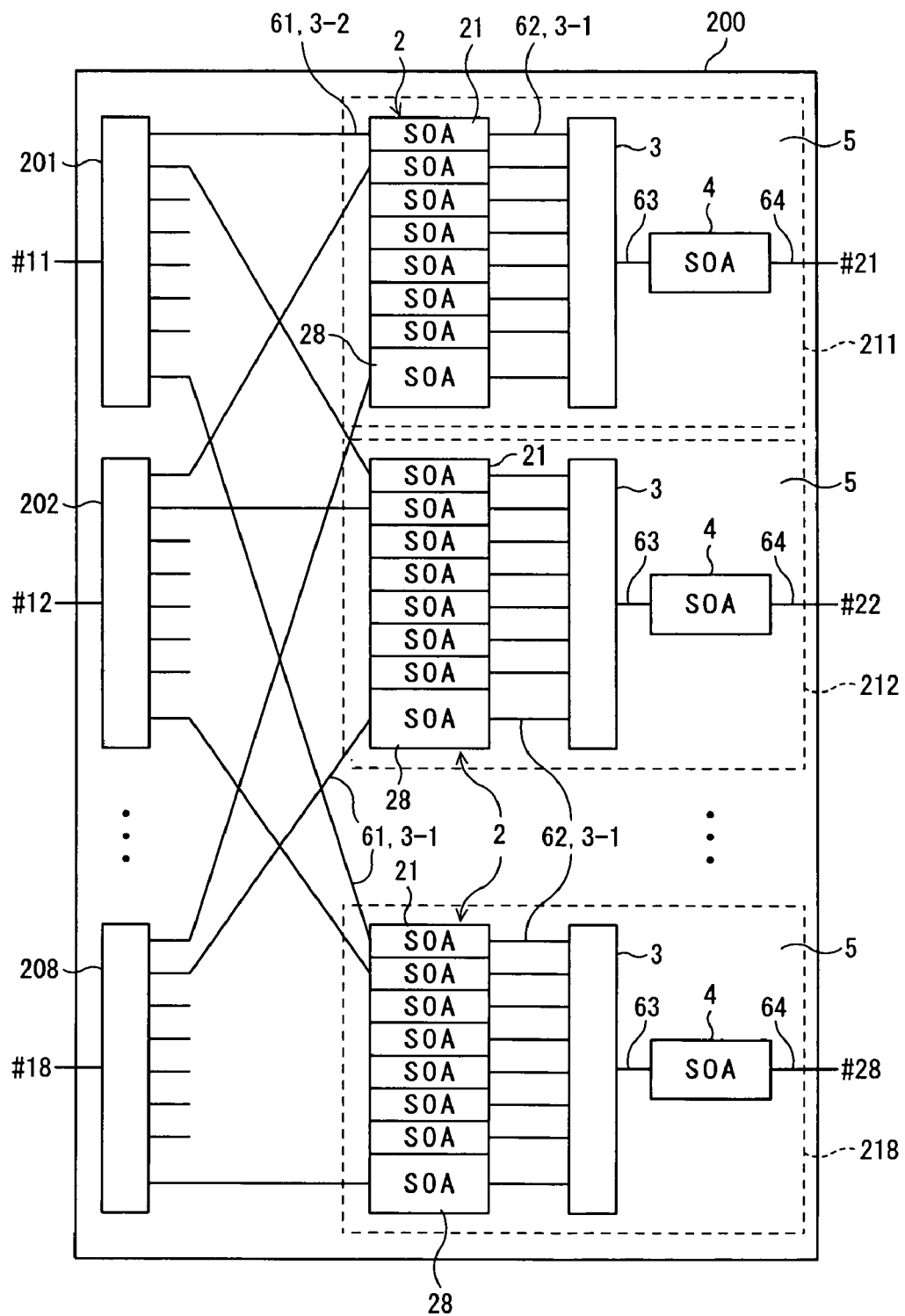
FIG. 14 is a diagram showing an optical switch device according to a second embodiment of the present invention.

FIG. 14 is a diagram showing an optical switch device 200 according to a second embodiment of the present invention. The optical switch 200 of FIG. 14 is an 8×8 optical matrix switch cooperating 1×8 (or 8×1) optical switches 1 according to the above-described first embodiment.

Figure 15:
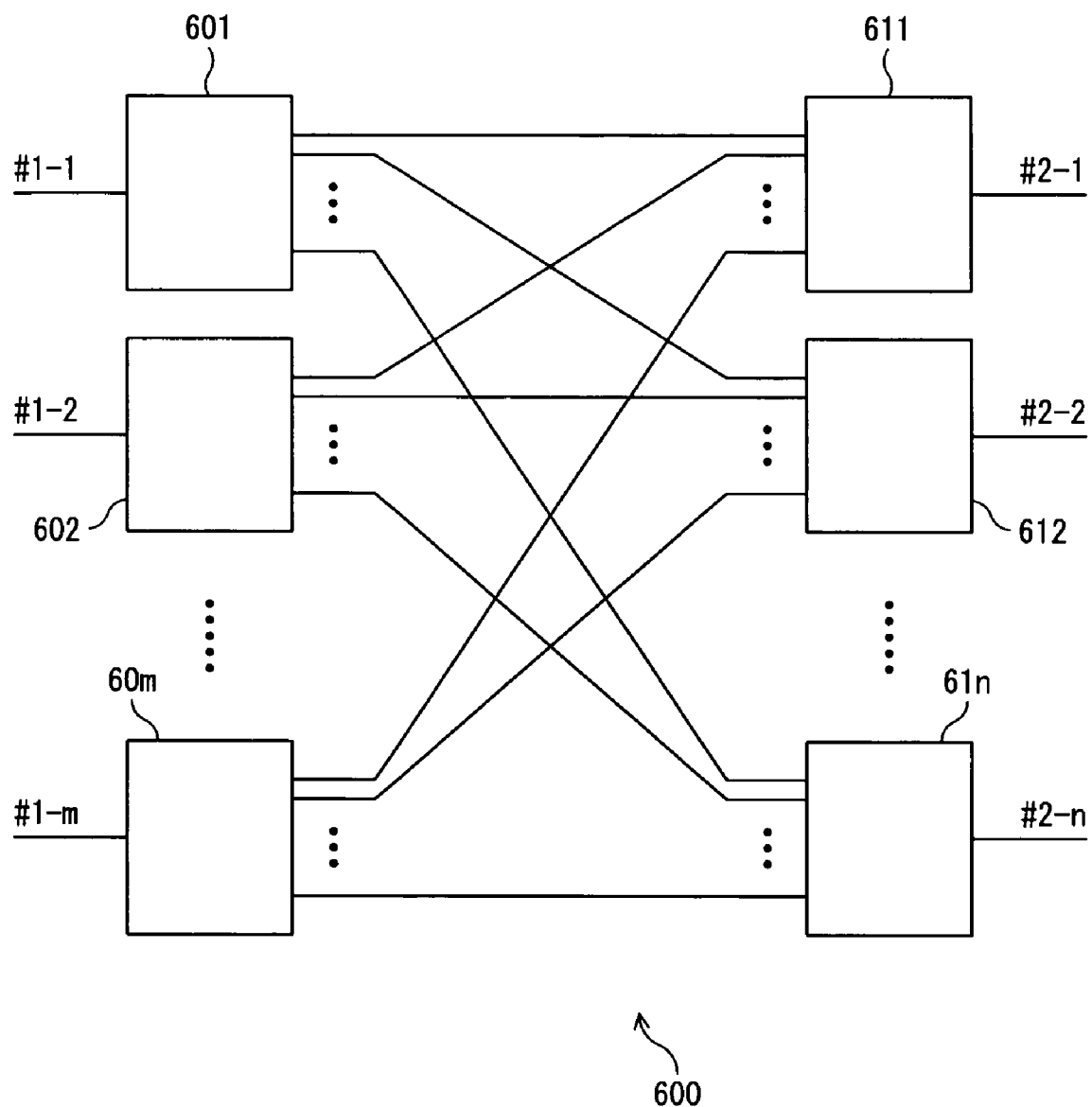
FIG. 15 is a diagram showing a construction of an optical matrix switch.

FIG. 15 is a block diagram showing a construction of m×n optical matrix switch 600 (m and n are integers greater than 1) with m-number of input ports (#1-1 through #1-*m*) and n-number of output ports (#2-1 through #2-*n*). The optical matrix switch 600 of FIG. 15 has m-number of 1×n optical dividing units 601 through 60*m* which divide incoming light from m-number input ports to n-number of output ports, and n-number of m×1 optical combining units 611 through 61*n* each of which combines m-number of light beams, one from each of the m-number of 1×n optical dividing units, and outputs the combined light to an output port assigned to each of the combining units.

The m-number of 1×n optical dividing units 601 through 60*m*, the n-number of m×1 optical combining units 611 through 61*n*, or both of these are provided in the form of optical switches, whereby the optical matrix switch 600 is constructed.

In the optical switch device 200 of the second embodiment, "m" and "n" of the optical matrix switch 600 of FIG. 15 are "8". The optical matrix switch 600 has eight 1×8 optical dividing units 201 through 208 and eight 8×1 optical combining units 211 through 218 which are the same as those of the above described first embodiment (see reference character 1).

In this instance, in FIG. 14, like reference characters to those of FIG. 1 indicate similar parts. Further, the eight 1×8 optical dividing units 201 can be realized by optical couplers already described with reference to FIG. 2, FIG. 9, and FIG. 10.

Here, as in the case of the first embodiment, each of the eight 8×1 optical combining units 211 through 218, each serving as an 8×1 optical switch, includes: an optical gate array 2 which is formed by eight optical gate switches 21 through 28, each employing a semiconductor optical amplifier element, arranged in parallel; a dividing/combining unit 3 having eight first ports 3-1 which are connected to eight optical gate switches 21 through 28 respectively and one second port 3-2 which performs light dividing/combining with the first port 3-1; and an SOA 4 connected to the second port 3-2 of the dividing/combining unit 3. These optical gate array 2, dividing/combining unit 3, and SOA 4 are formed in an integrated manner. The optical gate array 2 lets any of the incoming light beams input to the eight gate switches 21 through 28 pass therethrough and outputs the light beam to the dividing/combining unit 3 via the first port 3-1 corresponding to the gate switch which the light beam passes through. The SOA 4 amplifies the light input from the second port 3-2 of the dividing/combining unit 3 and outputs the amplified light. The optical gate array 2, the dividing/combining unit 3, and the SOA 4 are formed as a combining-side optical module.

With the above-described arrangement of the optical switch device 200 according to the second embodiment, it is possible for the optical switch device 200 to output the light, which is input from the eight input ports #11 through #18, to an arbitrary output port #21 through #28. Here, the 8×1 optical combining units 211 through 218 can be constructed as an 8×1 optical switch the same as that of the first embodiment (see reference character 1), so that the number of components is decreased, thereby reducing the manufacturing cost of the device. In addition, optical loss of the whole device is also reduced.

Further, as in the case of the first embodiment, eight 8×1 optical switches 211 through 218 are provided according to the number of output ports, thereby configuring an 8×8 optical matrix switch. Thus, in comparison with the construction in which an 8×8 optical matrix switch is configured using the 8×1 optical switches with the construction as shown in FIG. 19, the number of manufacturing procedures is significantly reduced, and the number of components can also be decreased accumulatively to the number of 8×1 optical switches.

In this instance, although the 8×8 optical matrix switch was described in detail in the optical switch device 200 of the second embodiment, the present invention should by no means be limited to this, and an m×n optical matrix switch with m and n input/output ports whose value is different from "8" can also be constructed.

Further, in the optical switch device 200 of the second embodiment, the 8×1 optical combining units 211 through 218 are realized by 8×1 optical switches, and 1×8 optical dividing units 201 through 208 are realized by optical couplers. However, the present invention should by no means be limited to this, and the 1×8 optical dividing units 201 through 208 can be realized by 1×8 optical switches similar to those of the first embodiment, and the 8×1 optical combining units 211 through 218 can be realized by optical couplers. Further, the 1×8 optical dividing units 201 through 208 can be constructed as 1×8 optical switches similar to those of the first embodiment, and the 8×1 optical combining units 211 through 218 can be realized by 8×1 optical switches.

[c] Third Embodiment

Figure 16:
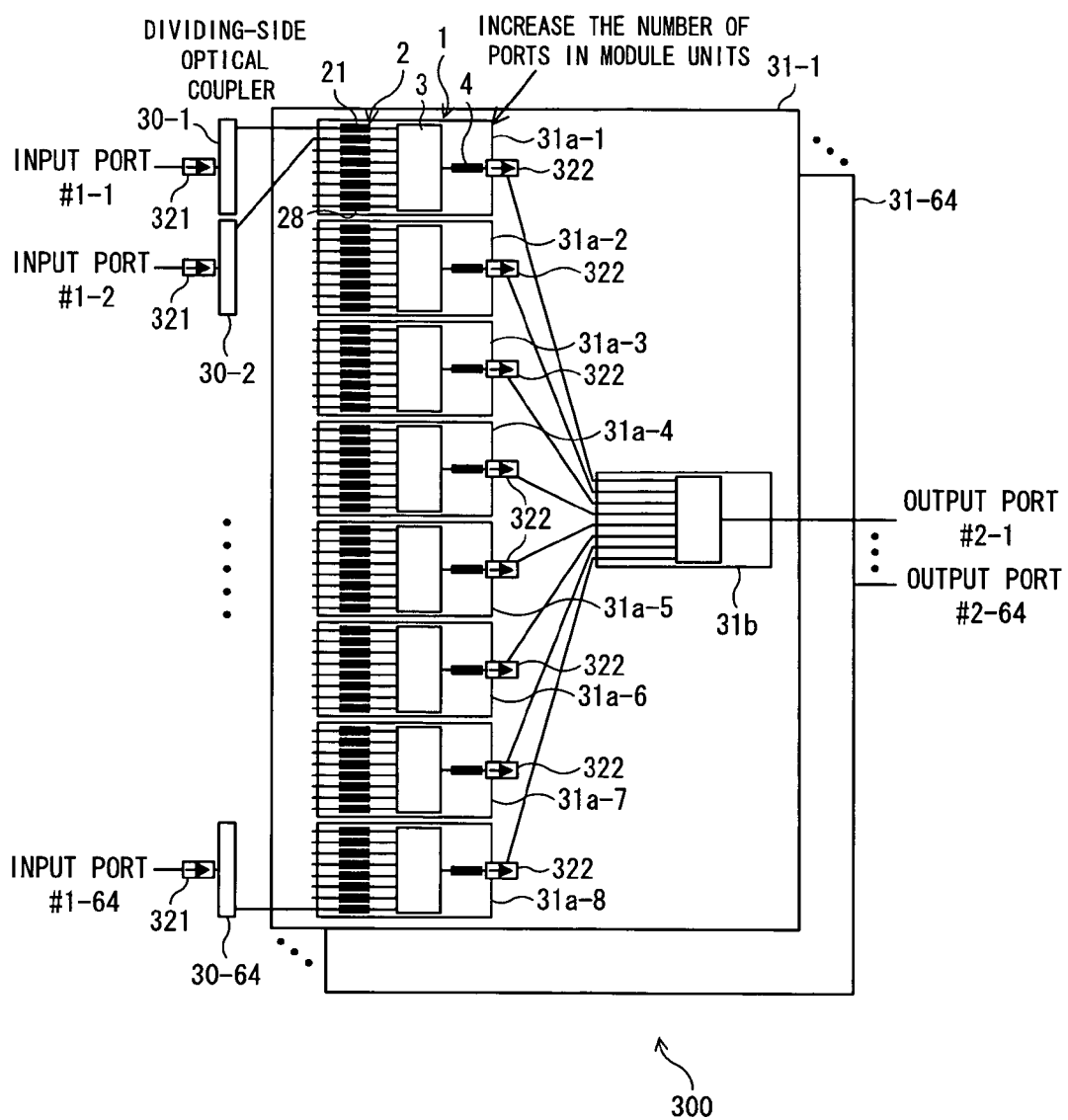
FIG. 16 is a diagram showing an optical switch device according to a third embodiment of the present invention.

FIG. 16 is a diagram showing an optical switch device according to a third embodiment of the present invention. In the optical switch device 300 of the third embodiment, "m" and "n" of the optical matrix switch 600 of FIG. 15 are "64", and has 64 1×64 optical dividing units 30-1 through 30-64 and 64 64×1 optical combining units 31-1 through 31-64. Each of the 64×1 optical combining units 31-1 through 31-64 function as a 64×1 optical switch, and 1×64 optical dividing units 30-1 through 30-64 are realized by optical couplers, whereby an operation of 64×64 optical matrix switch is realized.

Here, the 64×1 optical combining units 31-1 through 31-64 are provided for the 64 output ports #2-1 through #2-64, respectively. Each of the 64×1 optical combining units 31-1 through 31-64 includes eight 8×1 optical switches 31*a*-1 through 31*a*-8 similar to those of the first embodiment (see reference character 1) and a passive coupler 31*b* which combines the outputs of the optical switches 31*a*-1 through 31*a*-8 and outputs the light to a pertinent output port.

In this instance, in FIG. 16, illustration is made with attention paid to the construction of the 64×1 optical combining unit 31-1 which supplies output light to the output port #2-1 of the 64 output ports #2-1 through #2-64. Here, like reference characters to those of FIG. 1 indicate approximately the same parts in FIG. 1. In addition, 64 1×64 optical dividing units 30-1 through 30-64 can be realized by optical couplers already described with reference to FIG. 2, FIG. 9, or FIG. 10.

Here, a description will be made with attention paid to the construction of the 64×1 optical combining unit 31-1, out of the 64 64×1 optical combining units 31-1 through 31-64, which corresponds to the output port #2-1. Each of the 8×1 optical switch units 31*a*-1 through 31*a*-8 receives light from eight input ports as a unit, out of the input ports #1-1 through #1-64, and functions as a first combining unit which firstly combines the 64 light beams from the 64 1×64 optical dividing unit 30-1 through 30-64 into q=8 (<m=64) paths. The passive coupler 31*b* is a secondary combining unit which further combines the eight light beams, which have been combined by the 8×1 optical switches 31*a*-1 through 31*a*-8, into a single beam of light.

More specifically, the 8×1 optical switch 31*a*-1 receives light from the input ports #1-1 through #1-8 to its optical gate switches 21 through 28, respectively. The 8×1 optical switch 31*a*-2 receives light from the input ports #1-9 through #1-16 to its optical gate switches 21 through 28, respectively.

Here, the eight 8×1 optical switches 31*a*-1 through 31*a*-8 cooperate with one another, thereby selectively letting light, out of light input as described above from the input port #1-1 through #1-64, which is to be introduced to a pertinent output port #2-1, pass therethrough, and also blocking other light.

Here, the 8×1 optical switch units 31*a*-1 through 31*a*-8 are constructed as optical modules similar to those of the first embodiment (see reference character 1). More specifically, each of the 8×1 optical switch units 31*a*-1 through 31*a*-8 receives eight different light beams in a unit, out of the input ports #1-1 through #1-64, and light to be output to a pertinent output port (in this case, #2-1) is selectively output to the pertinent output port.

For this purpose, the 8×1 optical switches 31*a*-1 through 31*a*-8 are constructed as combining-side optical modules in which the optical gate array 2 formed by P=8 optical gate switches 21 through 28 arranged in parallel, the dividing/combining unit 3 which includes eight first ports 3-1 connected to eight optical gate switches 21 through 28, respectively, forming the optical gate array 2 and the second port 3-2 which performs optical dividing/combing with the first port 3-1, and the SOA 4 which is connected to the second port 3-2 of the dividing/combining unit 3, are formed in an integrated manner.

In each of the eight 8×1 optical switch units 31*a*-1 through 31*a*-8, which are eight combing-side optical modules, the optical gate array 2 selects light to be allowed to pass therethrough, out of input light input to the eight gate switches 21 through 28, and outputs the selected light to the dividing/combining unit 3 via the first port 3-1 corresponding to the gate switch 21 through 28 which the output light passes through. The SOA 4 amplifies the light input from the second port 3-2 of the dividing/combining unit 3 and then outputs the amplified light. With this arrangement, the passive coupler 32 is capable of outputting the light which has been selected by the 8×1 optical switch units 31*a*-1 through 31*a*-8 as light to be allowed to pass therethrough to the output port #2-1.

In other words, each of the q=8 combining side optical module 31*a*-1 through 31*a*-8 of the 64 64×1 optical combining units 31-1 through 31-64 receives p=8 different light beams, out of the 64 light beams from the 64 1×64 optical dividing unit 30-1 through 30-64. Further, q=8 combining-side optical modules 31*a*-1 through 31*a*-8 of each of the 64×1 optical combining unit 31-1 through 31-64 cooperate with one another, thereby selecting light, out of light from the 64 inputs #1-1 through #1-64, to be output to a pertinent output port.

The number "q" of 8×1 optical switch units 31*a*-1 through 31*a*-8 of each of the above-described 64×1 optical combining units 31-1 through 31-64 is "8" in the present embodiment. However, according to the number of active input/output ports of the optical switch device 300, the number p(=8)×q of optical gate switches of the optical gate array 2 can take a value greater than the number "m" of input ports in use.

With this arrangement, like in the case of introduction of the optical switch device 300, when the number of channels to be switched is smaller than 64×64, the 8×1 optical switch units are provided according to the number of channels, while it becomes possible to add 8×1 optical switch units when the number of channels to be switched is increased. Thus, effective capital investment becomes available according to the scale of operation of the device.

In this instance, the reference character 321 designates optical isolators provided for the input port #1-1 through #1-64, and the reference character 322 designates optical isolators provided for the output side of the 8×1 optical switch unit 31*a*-1 through 31*a*-8. As in the case of the first embodiment, it is not necessary to integrate optical isolators inside the 8×1 optical switch unit 31*a*-1 through 31*a*-8.

Since the optical switch device 300 of the third embodiment is constructed as described above, light input from 64 input ports #1-1 through #1-64 can be output from an arbitrary output port #2-1 through #2-64 of the 64 output ports #2-1 through #2-64.

At this time, each of the 64×1 optical combining units 31-1 through 31-64 is formed by the 8×1 optical switches 31*a*-1 through 31*a*-8 similar to the ones (see reference character 1) in the first embodiment and a passive coupler 32. Thus, as in the case of the above-described first embodiment of the present invention, the number of components is reduced, so that the manufacturing costs of the device are reduced, and so that optical loss of the whole of the device can be reduced.

[d] Fourth Embodiment

Figure 17:
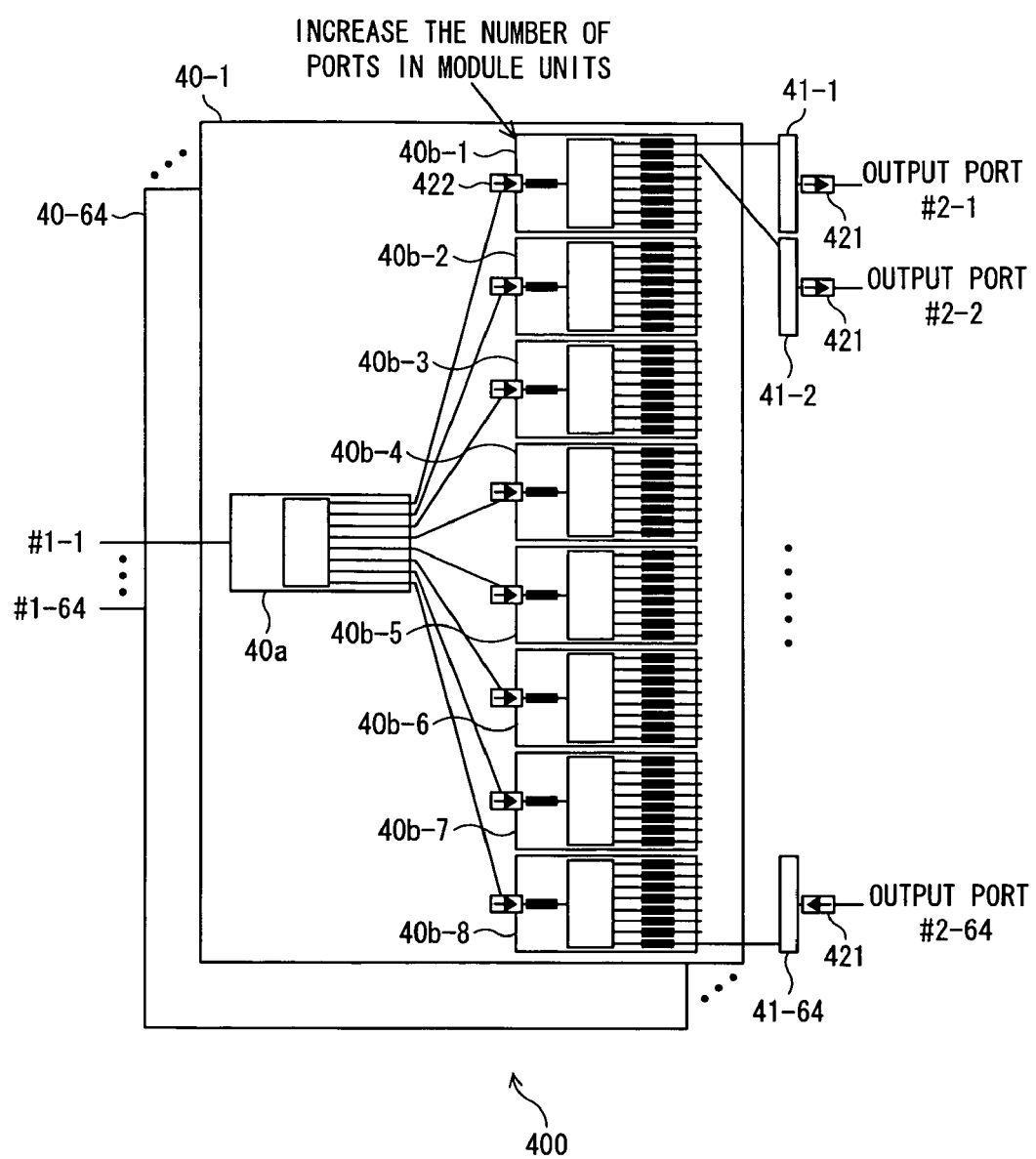
FIG. 17 is a diagram showing an optical switch device according to a fourth embodiment of the present invention.

FIG. 17 is a diagram showing an optical switch device 400 according to a fourth embodiment of the present invention. In the optical switch device 400 in the fourth embodiment, "m" and "n" of the optical matrix switch 600 of FIG. 15 are "64". The optical switch device 400 includes 64 1×64 optical dividing units 40-1 through 40-64 and 64 64×1 optical combining units 41-1 through 41-64. Each of the 1×64 optical dividing units 40-1 through 40-64 functions as a 1×64 optical switch. The 64×1 optical combining units 41-1 through 41-64 are formed by optical couplers, whereby a function of a 64×64 optical matrix switch is realized.

Here, the 1×64 optical dividing units 40-1 through 40-64 are provided for 64 input ports #1-1 through #1-64, respectively. Each of these has a passive coupler 40*a* which divides light from a pertinent input port into s=8 (64>s) light beams, and also has 1×8 optical switches 40*b*-1 through 40*b*-8 similar to those of the above-described first embodiment (see reference character 1).

In this instance, in FIG. 17, illustration is made with attention paid to the construction of the 1×64 optical dividing unit 40-1 which divides light from the input port #1-1 into 64 light beams. In addition, like reference characters to those of FIG. 1 indicate approximately the same parts. Further, 64 64×1 optical combining units 41-1 through 41-64 are realized by optical couplers as already shown in FIG. 2, FIG. 9, and FIG. 10.

Here, a description will be made with attention paid to the construction of the 1×64 optical dividing unit 40-1 corresponding to the input port #1-1, out of the 64 1×64 optical dividing units 40-1 through 40-64. The passive coupler 40*a* is a first dividing unit which divides light from the input port #1-1 into s-number of light beams (n=64>s). Further, the 1×8 optical switches 40*b*-1 through 40*b*-8 function as secondary dividing units which further divide 8 beams of light, which are divided by the passive coupler 40*a*, into r=8 beams of light, and supplies the divide light to the optical couplers 41-1 through 41-64 provided for the output ports #2-1 through #2-64, respectively.

For example, the 1×8 optical switch 40*b*-1 of the 1×64 optical dividing unit 40-1 supplies divided light from the input port #1-1 to the optical couplers 41-1 through 41-8 which are provided corresponding to the output port #2-1 through #2-8. The 1×8 optical switch 40*b*-2 can supply the divided light from the input port #1-1 to optical couplers 41-9 through 41-16 provided corresponding to the output port #2-9 through #2-16, respectively.

At this time, eight 1×8 optical switches 40*b*-1 through 40*b*-8, which form the second dividing unit, cooperate with one another, thereby selectively switching the optical couplers 41-1 through 41-64 to which light divided as described above is to be supplied, for letting light pass therethough. In addition, the 1×8 optical switches 40*b*-1 through 40*b*-8 block light other than the above-mentioned light.

Here, the optical switches 40*b*-1 through 40*b*-8, which form the second dividing unit, are given as optical modules similar to those of the above-described first embodiment (see reference character 1). More specifically, each of the 1×8 optical switches 40*b*-1 through 40*b*-8 is capable of switching of the eight output ports, out of the output ports #2-1 through #2-64, assigned to each of the optical switches 40*b*-1 through 40*b*-8 for letting light pass therethrough.

For this purpose, each of the eight optical switches 40*b*-1 through 40*b*-8 is given as a dividing-side optical module including: a gate array 2 formed by r=8 light gate switches arranged in parallel; an optical coupler unit 3 having r=8 first ports 3-1 connected to optical gate switches 21 through 28, respectively, forming the optical gate array 2 and a second port 3-2 which performs optical dividing/combining with the first ports 3-1; and an SOA 4 which is connected to the second port of the dividing/combining unit 3. The optical gate array 2, the dividing/combining unit 3, and SOA 4 are formed in an integrated manner.

In each of the eight optical switches 40*b*-1 through 40*b*-8, which are eight dividing-side optical modules, the SOA 4 amplifies incoming light from the passive coupler 40*a* and outputs the amplified light to the second port 3-2 of the dividing/combining unit 3. In the dividing/combining unit 3, r=8 first ports 3-1 divide and output the light from the SOA 4 to the optical gate switches 21 through 28 via the first ports 3-1, and the r=8 optical gate switches selectively output light, out of the divided light by the dividing/combining unit 3, to be output to the corresponding output port #2-1 through #2-64.

In other words, s-number of combining-side optical modules 40*b*-1 through 40*b*-8 cooperate with one another, thereby making it possible to select an output port to which light from the passive coupler 40*a* is to be output.

In this instance, "s" of the number s of optical switches 40*b*-1 through 40*b*-8 of the above-mentioned each of the 1×64 optical combining units 40-1 through 40-64 is "8" in the present embodiment. However, "r(=8)×s" of the number of optical gate switches of the optical gate array 2 can take a value s greater than n, which is the number of output ports in use, according to the number of input/output ports used in the optical switch device 400.

With this arrangement, like in a case where the optical switch 400 is introduced, for example, when the number of input/output switch channels (corresponding to the number of input/output ports in use) is smaller than 64×64, a 1×8 optical switch unit can be provided in accordance with the number of channels. In addition, as the number of channels increases, 1×8 optical switch units can be added. Thus, effective capital investment becomes available according to the scale of operation of the device.

In this instance, reference character 421 designates optical isolators provided one for each of the output ports #2-1 through #2-64, and reference character 422 designates optical isolators provided for the input sides of the 1×8 optical switches 40*b*-1 through 40*b*-8. However, as in the case of the first embodiment, it is not necessary to integrate optical isolators inside the 1×8 optical switch units 40*b*-1 through 40*b*-8.

Since the optical switch device 400 of the fourth embodiment is constructed as described above, light input from 64 input ports #1-1 through #1-64 can be output from an arbitrary output port #2-1 through #2-64 of the 64 output ports #2-1 through #2-64.

At this time, each of the 1×64 optical dividing units 40-1 through 40-64 is formed by the 1×8 optical switches 40*b*-1 through 40*b*-8 similar to the ones (see reference character 1) in the first embodiment and by a passive coupler 40*a*. Thus, as in the case of the above-described first embodiment of the present invention, the number of components is reduced, so that the manufacturing costs of the device are reduced, and so that optical loss of the whole of the device can be reduced.

(5) Fifth Embodiment

Figure 18:
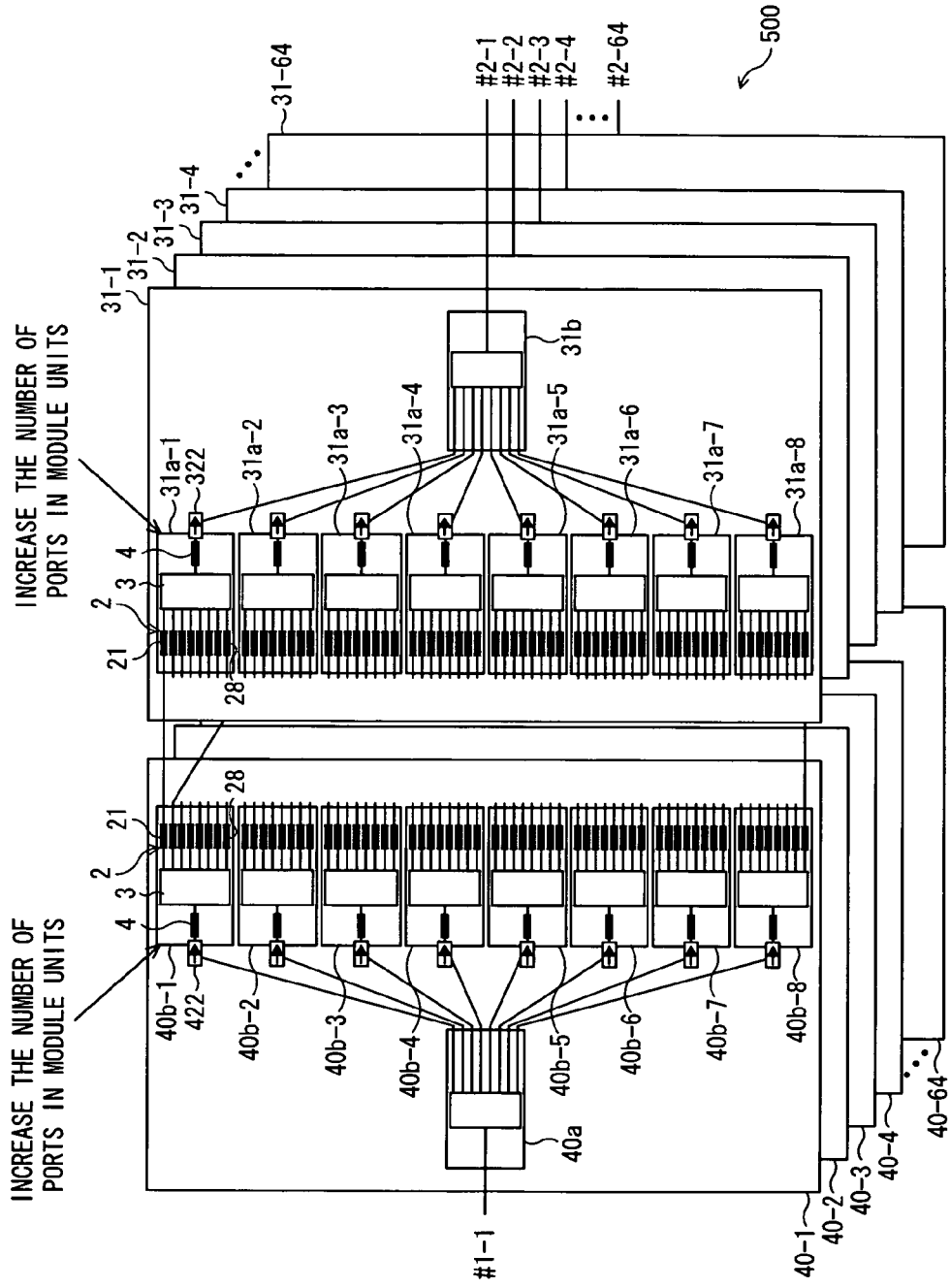
FIG. 18 is a diagram showing an optical switch device according to a fifth embodiment of the present invention.

FIG. 18 is a diagram showing an optical switch device 500 according to a fifth embodiment of the present invention. In the optical switch device 500 in the fifth embodiment, "m" and "n" of the optical matrix switch 600 of FIG. 15 are "64". The optical switch device 500 includes 64 1×64 optical dividing units 40-1 through 40-64 and 64 64×1 optical combining units 31-1 through 31-64. Each of the 1×64 optical dividing units 40-1 through 40-64 is given a similar construction to that of the above-described fourth embodiment, and thereby functions as a 1×64 optical switch. At the same time, each of the 64×1 optical combining units 31-1 through 31-64 is given a similar construction to that of the third embodiment, and thereby functions as a 64×1 optical switch. With this arrangement, the optical switch 500 functions as a 64×64 optical matrix switch.

In this instance, in FIG. 18, illustration is made with attention paid to the construction of the 1×64 optical dividing unit 40-1 which is provided corresponding to the input port #1-1, and to the construction of 64×1 optical combining unit 31-1 which is provided corresponding to the output port #2-1. However, the other 1×64 optical dividing units 40-2 through 40-64 have a similar construction to that of 1×64 optical dividing unit 40-1, and the other 64×1 optical combining units 31-2 through 31-64 have a similar construction to that of the 64×1 optical combining unit 31-1. In FIG. 18, like reference characters to those of FIG. 1, FIG. 16, and FIG. 17 indicate similar parts.

As in the case of the above-described third and fourth embodiments, according to the optical switch device 500 with the above construction, the number of components is reduced, so that the manufacturing costs of the device are reduced, and so that optical loss of the whole of the device can be reduced.

[f] Other Modifications

Further, various changes or modifications may be suggested without departing from the gist of the invention.

The above disclosure makes possible manufacturing of the device of the present invention.

What is claimed is:

1. An optical module, comprising:
an optical gate array in which a plurality of optical gate switches each employing a semiconductor optical amplifier element are arranged in parallel;
a dividing/combining unit including:
   a plurality of first ports, each of the first ports connected to one of the plurality of optical gate switches of said optical gate array; and
   a second port which performs dividing/combining of light with the first port; and
an optical amplifier connected to the second port of said dividing/combining unit, wherein
said optical gate array, said dividing/combing unit, and said optical amplifier are formed in an integrated manner,
said optical amplifier amplifies incoming light and outputs the amplified light to the second port of said dividing/combining unit,
said dividing/combining unit divides and outputs the light input from the optical amplifier to the plurality of optical gate switches via the plurality of first ports of said dividing/combining unit, and
each of the plurality of optical gate switches of said dividing/combining unit let one of a plurality of light beams, which are divided and output from said dividing/combining unit, pass therethrough and then be output.

2. An optical module as set forth in claim 1,
wherein said optical gate array lets one of the incoming light beams to its plurality of optical gate switches pass therethrough, and outputs the light beam to said dividing/combining unit via the first port corresponding to the optical gate switch which said light beam passes through, and
wherein said optical amplifier amplifies the light beam input from the second port of said dividing/combining unit and then outputs the amplified light.

3. An optical switch device, comprising:
m-number of 1×n optical dividing units which receive incoming light input from m-number of input ports and divide the received light to n-number of output ports;
n-number of m×1 optical combining units each of which combines m-number of light beams input from said m-number of 1×n optical dividing units, said n-number of m×1 optical combining units outputting the combined light to the n-number of output ports;
wherein each of the m×1 optical combining units selectively outputs one of the m-number of light beams from the m-number of 1×n optical dividing units, thereby serving as an m×1 optical switch unit which outputs one of the light beams from the m-number of input ports to a pertinent output port,
wherein each of the m×1 optical switch units include at least one combining-side optical module, which includes:
an optical gate array in which a plurality of optical gate switches each employing a semiconductor optical amplifier element are ranged in parallel;
a dividing/combining unit including:
a plurality of first ports connected one to each of the plurality of optical gate switches forming said optical gate array; and
a second port which performs dividing/combining of light with the first port; and
an optical amplifier connected to the second port of said dividing/combining unit, said optical gate ray, said dividing/combing unit, and said optical amplifier being formed in an integrated manner,
wherein said optical gate ray lets one of the incoming light beams to its plurality of optical gate switches pass therethrough, and outputs the light beam to said dividing/combining unit via the first port corresponding to the optical gate switch which said light beam passes through, and
wherein said optical amplifier amplifies the light beam input from the second port of said dividing/combining unit and then outputs the amplified light,
wherein each of the 1×n optical dividing units is configured as a dividing-side optical module including:
an optical gate array in which a plurality of optical gate switches are arranged in parallel;
a dividing/combining unit including:
   a plurality of first ports, each of the first ports connected to one of the plurality of optical gate switches of said optical gate array; and
   a second port which performs dividing/combining of light with the first port; and
an optical amplifier connected to the second port of said dividing/combining unit,
said optical gate array, said dividing/combing unit, and said optical amplifier being formed in an integrated manner, and
wherein said optical amplifier amplifies incoming light and outputs the amplified light to the second port of said dividing/combining unit,
wherein said dividing/combining unit divides and outputs the light input from the optical amplifier to the plurality of optical gate switches via the plurality of first ports of said dividing/combining unit, and
wherein each of the plurality of optical gate switches of said optical gate array let one of a plurality of light beams divided and output from said dividing/combining unit pass therethrough and then be output.

4. An optical switch device as set forth in claim 3,
wherein each of the m×1 optical switch units include:
an optical gate array in which m-number of optical gate switches are arranged in parallel;
a dividing/combining unit including:

m-number of first ports connected one to each of the m-number of optical gate switches forming said optical gate; and a second port which performs dividing/combining of light with the first port; and an optical amplifier connected to the second port of said dividing/combining unit, said optical gate array, said dividing/combing unit, and said optical amplifier being formed in an integrated manner as a single combining-side optical module.

5. An optical switch device as set forth in claim 3, wherein each of the m×1 optical switch units includes:

a first combining unit which firstly combines m-number of light beams from the m-number of 1×n optical dividing units into q (m>q)-number of paths; and a second combining unit which further combines the q-number of paths, which have been combined by said first combining unit, into a single path, wherein said first combining unit has q-number of combining-side optical modules arranged in parallel, each of said combining-side optical modules including:

an optical gate array in which p-number of optical gate switches, forming said optical gate array, are arranged in parallel;

a dividing/combining unit including:

p-number of first ports connected one to each of the p-number of optical gate switches forming said optical gate array; and a second port which performs dividing/combining of light with the first port; and an optical amplifier connected to the second port of said dividing/combining unit, said optical gate array, said dividing/combing unit, and said optical amplifier being formed in an integrated manner, and wherein each of the q-number of combining-side optical module receives p-number, out of m-number of light beams from the m-number of 1×n optical dividing units, of light beams, and said q-number of combining side optical modules cooperate with one another and thus select light to be output to a pertinent output port.

6. An optical switch device as set forth in claim 3, wherein each of the 1×n optical dividing units includes:

an optical gate array in which n-number of optical gate switches are arranged in parallel;

a dividing/combining unit including:

n-number of first ports connected one to each of the n-number of optical gate switches; and a second port which performs dividing/combining of light with the first port; and an optical amplifier connected to the second port of said dividing/combining unit, said optical gate array, said dividing/combing unit, and said optical amplifier being formed in an integrated manner as a single dividing-side optical module, wherein said optical amplifier amplifies incoming light and outputs the amplified light to the second port of said dividing/combining unit, wherein said dividing/combining unit divides and outputs the light amplified by the amplifier to the plurality of optical gate switches via the n-number of first ports, and, wherein the n-number of optical gate switches let one of the plurality of light beams, which are divided and output from said dividing/combining unit, pass therethrough and then be output.

7. An optical switch device as set forth in claim 3, wherein each of the 1×n optical dividing units includes:

a first dividing unit which firstly divides incoming light from the corresponding input port into s-number of light beams;

a second dividing unit which further divides each of the s-number of light beams, which have been divided by said first dividing unit, into r-number of light beams, wherein said second dividing unit has s-number of dividing-side optical modules arranged in parallel, each of said dividing-side optical modules including:

an optical gate array in which r-number of optical gate switches are arranged in parallel;

a dividing/combining unit including:

r-number of first ports connected one to each of r-number of optical gate switches forming said optical gate array; and a second port which performs dividing/combining of light with the first port; and an optical amplifier connected to the second port of said dividing/combining unit, said optical gate array, said dividing/combing unit, and said optical amplifier being formed in an integrated manner, and wherein the s-number of dividing-side optical modules cooperate with one another and thus select an output port to which light from said first dividing unit is to be output.

8. An optical switch device, comprising:

m-number of 1×n optical dividing units each of which divides incoming light from one of m-number of input ports to n-number of output ports; and n-number of m×1 optical combining units each of which combines m-number of light beams one from each of the m-number of 1×n optical dividing units, and outputs a light beam to an output port assigned to each said m×1 optical combining units, wherein each of the 1×n optical dividing units is configured as a 1×n optical switch unit which outputs light from the input port to an m×1 optical combining unit which is coupled to one of the n-number of output ports, wherein each said 1×n optical switch unit includes at least one dividing-side optical module, which includes:

an optical gate array in which a plurality of optical gate switches each employing a semiconductor optical amplifier element are arranged in parallel;

a dividing/combining unit including:

a plurality of first ports, each of the first ports connected to one of the plurality of optical gate switches of said optical gate array; and a second port which performs dividing/combining of light with the first port; and an optical amplifier connected to the second port of said dividing/combining unit, said optical gate array, said dividing/combing unit, and said optical amplifier being formed in an integrated manner, and wherein said optical amplifier amplifies incoming light and outputs the amplified light to the second port of said dividing/combining unit, wherein said dividing/combining unit divides and outputs the light input from the amplifier to the plurality of optical gate switches of said dividing/combining unit via the plurality of first ports, and, wherein the plurality of optical gate switches of said optical gate array let one of the plurality of light beams, which are divided and output from said dividing/combining unit, pass therethrough and then be output.

9. An optical switch device as set forth in claim 8, wherein each of the 1×n optical dividing units includes:

an optical gate array in which n-number of optical gate switches are arranged in parallel;

a dividing/combining unit including:

n-number of first ports connected one to each of the n-number of optical gate switches; and a second port which performs dividing/combining of light with the first port; and an optical amplifier connected to the second port of said dividing/combining unit, said optical gate array, said dividing/combing unit, and said optical amplifier being formed in an integrated manner as a single dividing side optical module, wherein said optical amplifier amplifies incoming light and outputs the amplified light to the second port of said dividing/combining unit, wherein said dividing/combining unit divides and outputs the light amplified by the amplifier to the plurality of optical gate switches via the n-number of first ports, and, wherein the n-number of optical gate switches let one of the plurality of light beams, which are divided and output from said dividing/combining unit, pass therethrough and then be output.

10. An optical switch device as set forth in claim 8, wherein each of the 1×n optical dividing units includes:

a first dividing unit which firstly divides incoming light from the corresponding input port into s-number of light beams;

a second dividing unit which further divides each of the s-number of light beams, which have been divided by said first dividing unit, into renumber of light beams, wherein said second dividing unit has s-number of dividing-side optical modules arranged in parallel, each of which dividing-side optical modules includes:

an optical gate array in which r-number of optical gate switches are arranged in parallel;

a dividing/combining unit including:

r-number of first ports connected one to each of renumber of optical gate switches forming said optical gate array; and a second port which performs dividing/combining of light with the first port; and an optical amplifier connected to the second port of said dividing/combining unit, said optical gate array, said dividing/combing unit, and said optical amplifier being formed in an integrated manner, and wherein the s-number of dividing-side optical modules cooperate with one another and thus select an output port to which light from said first dividing unit is to be output.

* * * * *

UNITED STATES PATENT AND TRADEMARK OFFICE
CERTIFICATE OF CORRECTION

PATENT NO. : 7,720,378 B2
APPLICATION NO. : 11/439239
DATED : May 18, 2010
INVENTOR(S) : Yasuhiko Aoki It is certified that error appears in the above-identified patent and that said Letters Patent is hereby corrected as shown below:

Column 18, Line 17 delete "ranged" and insert --arranged--.

Column 18, Line 25 delete "ray," and insert --array,--.

Column 18, Line 28 delete "ray" and insert --array--.

Column 22, Line 3 delete "renumber" and insert --r-number--.

Column 22, Line 10 delete "renumber" and insert --r-number--.

Signed and Sealed this

Seventh Day of September, 2010

David J. Kappos
*Director of the United States Patent and Trademark Office*